March 17, 1964  J. J. FUCHS  3,125,600
PROCESS FOR THE PRODUCTION OF ADIPIC ACID
Filed Jan. 18, 1960  2 Sheets-Sheet 1
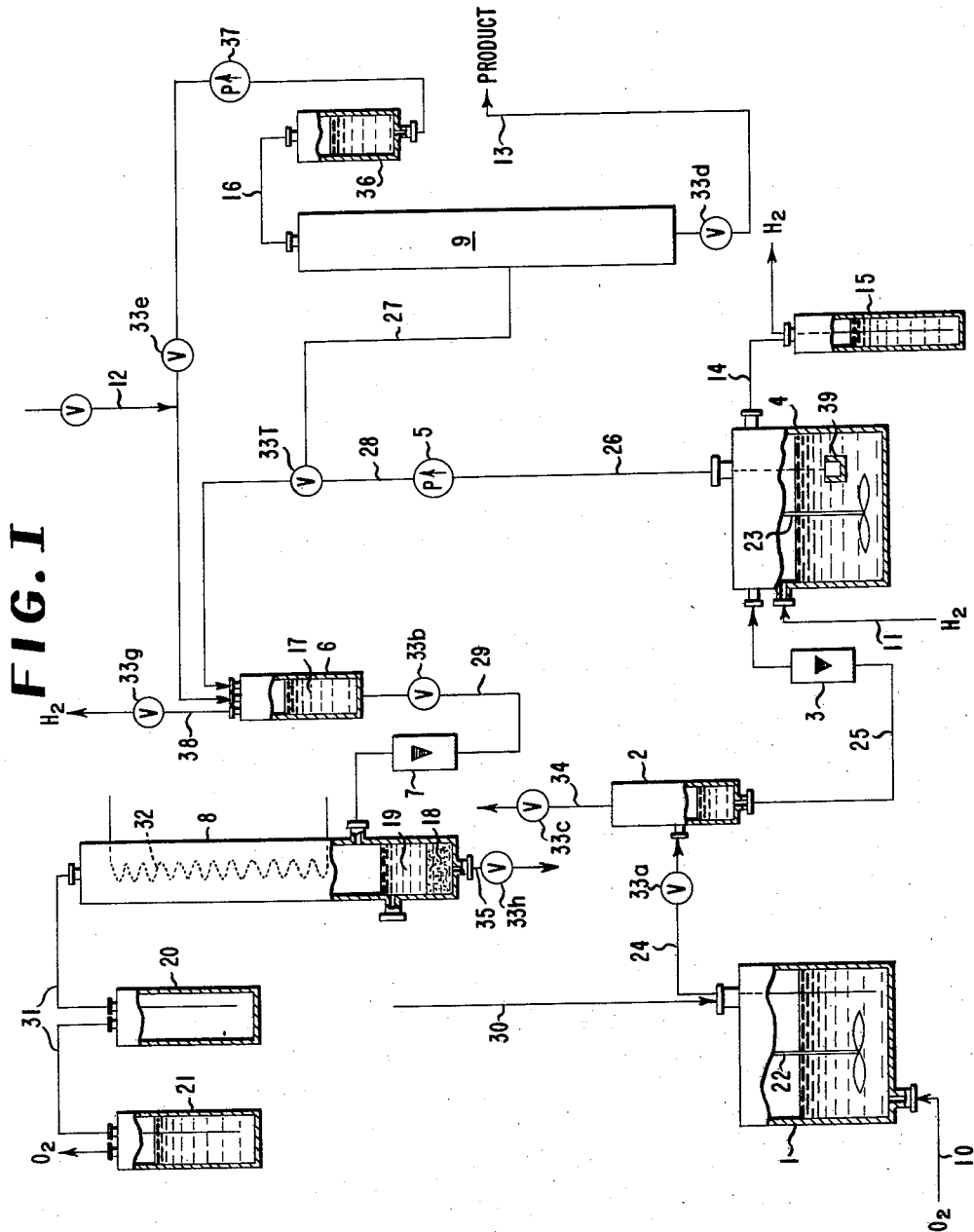
FIG. I
INVENTOR
JULIUS JACOB FUCHS
BY
ATTORNEY March 17, 1964 J. J. FUCHS 3,125,600
PROCESS FOR THE PRODUCTION OF ADIPIC ACID
Filed Jan. 18, 1960 2 Sheets-Sheet 2
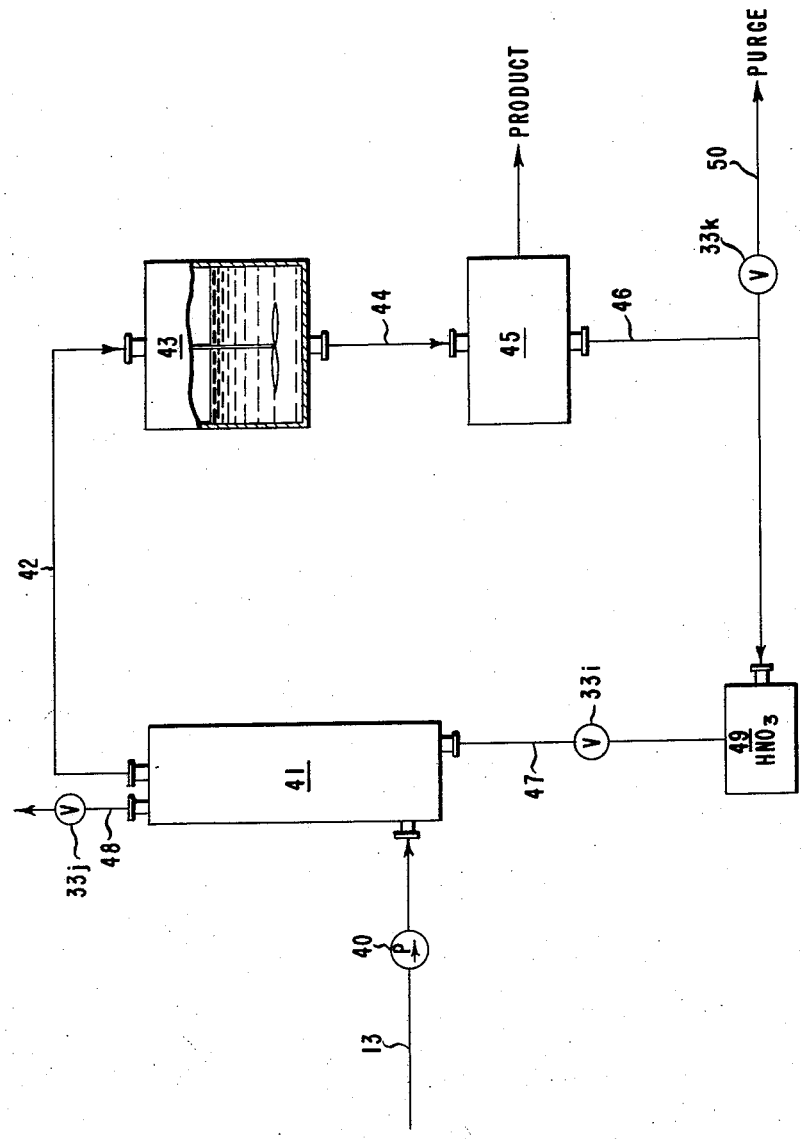
FIG. II
INVENTOR
JULIUS JACOB FUCHS
BY
ATTORNEY

United States Patent Office 3,125,600
Patented Mar. 17, 1964

3,125,600
PROCESS FOR THE PRODUCTION OF
ADIPIC ACID
Julius Jacob Fuchs, Charleston, W. Va., assignor to E. I. du Pont de Nemours and Company, Wilmington, Del., a corporation of Delaware
Filed Jan. 18, 1960, Ser. No. 3,142
1 Claim. (Cl. 260—537)

This invention is concerned with a process for the synthesis of adipic acid from cyclohexanecarboxylic acid or its esters. More particularly, this invention is concerned with a process for the synthesis of adipic acid which comprises the oxidation of alkyl cyclohexanecarboxylates with a gas containing molecular oxygen followed by catalytic hydrogenation of the product to give alkyl 1-hydroxycyclohexanecarboxylates and subsequent nitric acid oxidation of the 1-hydroxycyclohexanecarboxylic acid or its ester to adipic acid.

Adipic acid is a particularly valuable monomer for the synthesis of a number of high molecular weight, linear polycarboxamides generally termed nylons. The condensation polymerization of adipic acid with hexamethylenediamine yields 66-nylon, an important polymer used for spinning textile yarns and filaments as well as for molding or extrusion of thermoplastic articles. Because of the highly competitive nature of this field, new and potentially cheaper routes to the polymer intermediates are constantly being sought in an effort to provide nylons at lower cost.

The liquid-phase air- or molecular oxygen-oxidation of carboxylic esters having a tertiary hydrogen atom attached to the alpha carbon atom is described in a copending application Serial Number 3,141, filed January 18, 1960 by J. J. Fuchs, now Patent No. 3,068,275. The primary products of this oxidation are tertiary-1-hydroperoxy carboxylic esters which then can be hydrogenated to tertiary-1-hydroxycarboxylic esters. The disclosure of copending application Serial Number 3,141 is incorporated herein by reference.

An object of the present invention is to provide a process for the production of adipic acid from cyclohexanecarboxylic acid or its esters. Another object of this invention is to provide a process for the production of adipic acid by the nitric acid oxidation of 1-hydroxycyclohexanecarboxylic acid or its esters. Other objects and advantages of the subject invention will become apparent hereinafter.

It has now been discovered that the objects and advantages of this invention can be achieved by providing a process for the production of adipic acid which comprises: (1) subjecting a compound selected from the class consisting of cyclohexanecarboxylic acid and alkyl cyclohexanecarboxylates to liquid phase oxidation with a gas containing a molecular oxygen at a temperature between 70° and 200° C. under a pressure between atmospheric and about 500 atmospheres for a time sufficient to permit the formation of from 0.1% to 6% by weight of the 1-hydroperoxy derivative; (2) hydrogenating the hydroperoxy derivative to the 1-hydroxy derivative in the presence of a hydrogenation catalyst at ambient temperature under a pressure between about one and about 100 atmospheres of hydrogen and separating the 1-hydroxy derivative from the unoxidized portion of the starting material by fractional distillation; and (3) oxidizing the 1-hydroxy derivative with aqueous nitric acid in the presence of copper and vanadium salts as catalysts at a temperature between about 30° and 150° C.

FIGURE I is a schematic flowsheet of the continuous oxidation-hydrogenation portion of the process of this invention; it is more fully described below. FIGURE II is a schematic flowsheet of the nitric acid oxidation portion of the process of this invention; it is more fully described hereinbelow.

For the successful operation of the liquid-phase, molecular oxygen oxidation portion of the process of this invention, it is preferable that it be carried out in the absence of metals or other oxidation catalysts since such materials also catalyze the decomposition of the hydroperoxide product to give a variety of decomposition products in admixture. Ceramic or glass-lined autoclaves are suitable for the operation of the process at elevated pressures. All glass equipment may be employed if desired for operation of the process at atmospheric pressure.

It has been found that the liquid phase oxidation process of this invention can be carried out over a temperature range of from 70° to 200° C., but preferably, the temperature of the reaction should be between 100° and 170° C. At temperatures below 100° C., the oxidation proceeds very slowly so that in general, it is not as economical to carry it out in the temperature range of 70 to 100° C. Above 170° C., the rate of reaction is very rapid, but there is more tendency for the undesirable thermal decomposition of the hydroperoxide product to occur. The process is operable at atmospheric pressure when high boiling carboxylic esters are employed. In general, the process can be carried out at pressures between atmospheric pressure and about 500 atmospheres pressure. Either air or pure oxygen gas can be employed in the process of this invention. Where air is used, provision must be made for passing larger gas volumes into the oxidizer and for removing the large volume of inert nitrogen from the oxidizer.

Maximum peroxide concentrations in the oxidizer of between 4 and 6% can be obtained by the process of this invention when carboxylic esters are employed. In order to reach such concentrations, the reaction time will vary from about 1½ to 2 hrs. contact time at 150° C. to 50 hours at 90° C. If the reaction time is extended too far beyond the optimum time, the peroxide concentration decreases from the maximum obtainable. This liquid phase oxidation with molecular oxygen proceeds smoothly with cyclohexanecarboxylic acid, as well as with the alkyl esters of this acid. This is surprising since the aliphatic carboxylic acids containing a tertiary hydrogen atom in the alpha position (e.g. isobutyric acid) are not oxidized under the conditions of this process. However, when the acid is employed, the hydroperoxide is not isolated since it decomposes to a mixture comprising cyclohexanone and 1-hydroxy-1-carboxycyclohexane. This mixture can then be oxidized with nitric acid directly to adipic acid without first subjecting it to the hydrogenation step of the process.

The hydrogenation of alkyl 1-hydroperoxycyclohexanecarboxylates proceeds readily at room temperature and pressure although higher temperatures and pressures can be employed. Hydrogenation catalysts such as slurried palladium catalyst, platinum black, platinum oxide, Raney nickel, copper chromite, etc., are effective.

If desired, the first two steps of the process can be carried out as a continuous, cyclic process for the oxidation of an alkyl cyclohexanecarboxylate (e.g. methyl cyclohexanecarboxylate), followed by the hydrogenation of the resultant hydroperoxide to the alkyl 1-hydroxycyclohexanecarboxylate. The apparatus is arranged to continuously pump the effluent from the oxidizer to a hydrogenation vessel, and to continuously pump the major portion of the effluent from the hydrogenator back to the oxidizer, while taking off a portion of the hydrogenated effluent for recovery of product which is then passed to a nitric acid oxidizer.

The operation of this process can be understood in more detail by reference to FIGURE I, which shows a schematic flowsheet of the oxidation-hydrogenation portion of this process.

In FIGURE I, 1 is the oxidizer vessel equipped with a stirrer 22, an oxygen inlet tube 10, a product stream exit tube 24, and a tube 30 for recycling to the oxidizer the carboxylic ester containing in solution a portion of the 1-hydroxycarboxylic ester.

From the oxidizer the product stream containing hydroperoxycarboxylic esters in solution in unreacted ester passes through tube 24 to a reservoir 2, whereas excess, unreacted oxygen is separated and passed either to recycle or to the atmosphere through tube 34. From this reservoir the product stream passes through a tube 25, and a rotameter 3, to the hydrogenator 4, which is equipped with a stirrer 23, a hydrogen inlet tube 11, and hydrogen exit tube 14; excess hydrogen is passed out through pressure regulator 15, to recycle.

From the hydrogenator, the proccess stream passes into tube 26, through filter 39, to pump 5, and thence through tube 28, to a reservoir 6, where hydrogen is separated and taken off overhead through tube 38. The liquid product solution 17, containing unreacted carboxylic ester, 1-hydroxycarboxylic ester, and water produced by the hydrogenation, is passed through tube 29, and a rotameter 7, to a cooler 8, containing a cooling coil 32. In this cooler, the process stream separates into two phases, and the water 18 is bled out through tube 35, while the solution of 1-hydroxy carboxylic ester in carboxylic ester 19, is passed back to the oxidizer through tube 30. Oxygen passing back through tube 30 from the oxidizer is passed out overhead through the cooler 8, tube 31, cold trap 20, and pressure regulator 21, and hence to recycle or the atmosphere.

A portion of the product stream from the hydrogenator is bled out of the recirculating system through T-valve 33T, and tube 27, to a fractionating column 9, operating under a partial vacuum, where the unreacted carboxylic ester is taken overhead through tube 16, and recirculated to reservoir 6, through reservoir 36, and pump 37. The 1-hydroxycarboxylic ester product is taken off from the bottom of the fractionating column through tube 13. Additional carboxylic ester to replace the separated, oxidized product, is added to the system through inlet tube 12.

In FIGURE II, which shows the nitric acid oxidation portion of the process, the alkyl 1-hydroxycyclohexanecarboxylate product, together with oxygen-containing byproducts, is passed through tube 13 and pump 40, to the nitric acid oxidizer 41. Aqueous nitric acid solution is passed from a make-up tank 49, into oxidizer 41 through tube 47. Gaseous oxidation products are allowed to escape through tube 48. The liquid nitric acid solution of adipic acid is passed from the oxidizer through tube 42 to a stirred crystallizer 43, and the slurried product mixture is passed thence through tube 44 to a centrifuge or filter 45, for separation of the crystallized adipic acid. The nitric acid mother liquor is passed back to the nitric acid make-up tank, a portion being purged through tube 50 for purification from byproduct acids.

Throughout the system, valves are indicated by 33a–33k. Valves 33a and 33b are adjusted to keep the flow rate constant through the recirculating system and are controlled for this effect by rotameters 3 and 7.

The cyclic liquid-phase oxidation is adjusted to the point where the concentration of alkyl 1-hydroperoxylcyclohexanecarboxylate is not more than 1% by weight in order to obtain minimum loss by thermal decomposition and maximum yield of alkyl 1-hydroxycyclohexanecarboxylate for subsequent oxidation with nitric acid. In any case, the total oxidized product is passed to the nitric acid oxidation since some byproducts from thermal decomposition of the hydroperoxide (cyclohexanone, cyclohexanol, cyclohexyl cyclohexanecarboxylate) also yield adipic acid on nitric acid oxidation.

The nitric acid oxidation of 1-hydroxycyclohexane-carboxylic acid, or of its esters, can be effected, at temperatures between 30 and 150° C. at pressures between atmospheric and about 500 p.s.i. using an aqueous nitric acid solution of 30–70% strength, based on volatile content, in the presence of a catalyst consisting essentially of dissolved copper salts plus dissolved vanadium or manganese salts. The total concentration of catalyst should be in the range of 0.01–0.5% by weight based on the nitric acid solution. In this step, the 1-hydroxycyclohexanecarboxylates are oxidized to adipic acid in yields of about 90% or better, and the adipic acid is recovered by crystallization from the aqueous nitric acid solution.

The process of this invention can be indicated briefly by the following chemical equations, in which R is H or alkyl.

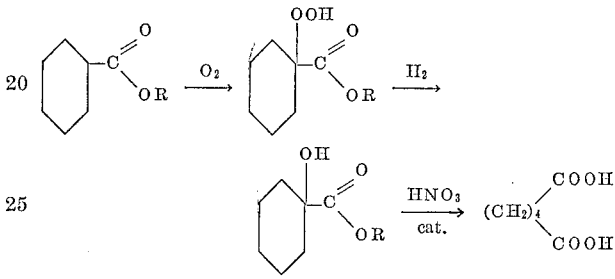

The following examples are illustrative of preferred methods for carrying out the process of the subject invention. They are intended to be illustrative only, and not limiting on the scope of the invention.

*Example 1*

500 g. of methyl hexahydrobenzoate (methyl cyclohexane carboxylate) was charged to a 1-liter glass vessel provided with gas inlet and outlet tubes, a reflux condenser, and a high speed agitator. Pure oxygen was bubbled into the reaction mixture, which was maintained at 130° C., at a rate sufficient to give an off-gas volume of 1 cubic foot per hour. Five and nine-tenths percent peroxide concentration was obtained after a total reaction time of nine hours. The hydroperoxide was isolated by distilling off unreacted starting material at 30° C. under a pressure of 1.0 mm. Hg, using all glass equipment. The tails from this distillation contained between 30 and 50% of the methyl 1-hydroperoxyhexahydrobenzoate product (methyl hydroperoxycyclohexanecarboxylate) which was distilled at 43–45° C. at a pressure ranging from 0.5 to 1.0 mm. Hg to yield a distillate containing 64% by weight of the hydroperoxide ester.

*Example 2*

One part by weight of 1-hydroxy-1-carbomethoxy-cyclohexane (methyl 1-hydroxycyclohexanecarboxylate) obtained by the hydrogenation of the product of Example 1, was added gradually with stirring to 50 parts by weight of 50% aqueous $HNO_3$ containing 0.3% Cu and 0.1% V as salts at 75° C. After the oxidation reaction had essentially ceased, the solution was heated to 110° C. for 15 minutes and then analyzed for carboxylic acids. The yield of adipic acid was 89.5%, the yield of glutaric acid was 6.6%, and the yield of succinic acid was 2.9%.

*Example 3*

One part by weight of 1-hydroxy-1-carboxycyclohexane (1-hydroxycyclohexanecarboxylic acid), obtained from saponification of 1-hydroxy-1-carbomethoxycyclohexane (methyl 1-hydroxycyclohexanecarboxylate) was added gradually, with stirring to 50 parts by weight of 50% aqueous $HNO_3$ containing 0.3% Cu and 0.1% V as salts. The reaction temperature was maintained at about 65° C. during the addition. When the oxidation reaction had essentially ceased, as judged by a fall in the temperature of the reacting solution, the solution was heated to 110° C. for 15 minutes and then analyzed for dicarboxylic acids. The yield of adipic acid was 89.8%, the yield of glutaric acid was 5.0%, and the yield of succinic acid was 2.2%.

*Example 4*

The continuous oxidation-reduction cyclic process described hereinabove and illustrated by FIGURES I and II was applied to methyl cyclohexanecarboxylate. The methyl 1-hydroxycyclohexanecarboxylate obtained as intermediate product, after separation and recycle of the unreacted starting material, was passed, together with other oxidized byproducts, to a nitric acid oxidizer operated under the conditions of Example 2 hereinabove. Adipic acid was recovered by crystallization from the nitric acid solution, in yields of 60–90%, based on methyl cyclohexanecarboxylate. Highest yields were obtained by operating the liquid phase $O_2$ oxidation step at conversions under 0.5% per pass.

*Example 5*

A charge consisting of 1000 g. of acetic acid as solvent, 2000 g. hexahydrobenzoic acid, and 0.3 g. cobalt as cobalt-naphthenate was air-oxidized at 150–163° C. in an agitated, two-gallon autoclave. At 150° C. no induction period was observed, and the $CO_2$ and CO content of the off gas reached a maximum after 20 minutes reaction time. After a total reaction time of 140 minutes, 105.7 g. of oxygen had been consumed and 75.5 g. $CO_2$ plus 11.4 g. CO had been formed. Based on these numbers, a 64% yield to cyclohexanone was calculated.

The reaction products were identified by distillation of the product under 50 mm. pressure until the head temperature reached 100° C. The distillate was diluted with water and redistilled employing a decanter head. For analysis, a portion of the organic phase was separated, extracted with dilute NaOH, washed with water, dried, and fractionated. Cyclohexanone was obtained as the major product with cyclohexanol and cyclohexylacetate as minor products. The mixture of products was then oxidized to adipic acid with nitric acid, under conditions described in Example 2.

The air-oxidation of hexahydrobenzoic acid is surprising since isobutyric acid did not oxidize under similar conditions.

I claim:

A process for the production of adipic acid which comprises subjecting methyl 1-hydroxycyclohexanecarboxylate to oxidation with aqueous nitric acid solution of 30–70% strength in the presence of 0.01–0.5% by weight, based on the nitric acid solution, of a mixture of salts of copper and vanadium at a temperature between 30° and 150° C. and at a pressure between atmospheric and about 500 p.s.i., and isolating adipic acid by crystallization from the nitric acid solution.

References Cited in the file of this patent

UNITED STATES PATENTS

| | | |
|---|---|---|
| 2,831,024 | Brown et al. | Apr. 15, 1958 |
| 2,844,626 | Kamlet | July 22, 1958 |
| 2,851,496 | Cates et al. | Sept. 9, 1958 |

OTHER REFERENCES

Sabatier: "Catalysis in Organic Chemistry," 1922, pages 165–166.

Serial No. 391,311, Speer (A.P.C.), published Apr. 20, 1943.